(12) United States Patent
Mah et al.

(10) Patent No.: US 8,562,869 B2
(45) Date of Patent: Oct. 22, 2013

(54) POROUS ANODE ACTIVE MATERIAL, METHOD OF PREPARING THE SAME, AND ANODE AND LITHIUM BATTERY EMPLOYING THE SAME

(75) Inventors: Sang-kook Mah, Seoul (KR); Han-su Kim, Seoul (KR); Dong-min Im, Seoul (KR)

(73) Assignee: Samsung SDI Co., Ltd., Yongin-si (KR)

(*) Notice: Subject to any disclaimer, the term of this patent is extended or adjusted under 35 U.S.C. 154(b) by 208 days.

(21) Appl. No.: 13/243,039

(22) Filed: Sep. 23, 2011

(65) Prior Publication Data
US 2012/0013051 A1 Jan. 19, 2012

Related U.S. Application Data

(62) Division of application No. 11/829,787, filed on Jul. 27, 2007, now Pat. No. 8,048,339.

(30) Foreign Application Priority Data

Dec. 19, 2006 (KR) .................. 10-2006-0130375

(51) Int. Cl.
*H01B 1/06* (2006.01)
*H01B 1/24* (2006.01)
*H01M 4/13* (2010.01)
*C01B 31/00* (2006.01)
*B28B 1/00* (2006.01)

(52) U.S. Cl.
USPC ..... 252/506; 252/510; 429/231.95; 264/29.1; 264/621

(58) Field of Classification Search
USPC ............. 252/506, 510; 429/231.95; 264/29.1, 264/621
See application file for complete search history.

(56) References Cited

U.S. PATENT DOCUMENTS 4,410,607 A 10/1983 Arons et al.
5,080,963 A 1/1992 Tatarchuk et al.
(Continued)

FOREIGN PATENT DOCUMENTS

| CN | 1265232 A | 8/2000 |
| CN | 142880 | 7/2003 |

(Continued)

OTHER PUBLICATIONS

Barrett, E. P. et al., "The Determination of Pore Volume and Area Distributions in Porous Substances. I. Computations from Nitrogen Isotherms", Journal Am. Chem. Society, vol. 73, Jan. 1951, pp. 373-380.

(Continued)

*Primary Examiner* — Mark Kopec
*Assistant Examiner* — Jaison Thomas
(74) *Attorney, Agent, or Firm* — Christie, Parker & Hale, LLP

(57) ABSTRACT

Provided are a porous anode active material, a method of preparing the same, and an anode and a lithium battery employing the same. The porous anode active material includes fine particles of metallic substance capable of forming a lithium alloy; a crystalline carboneous substance; and a porous carboneous material coating and attaching to the fine particles of metallic substance and the crystalline carboneous substance, the porous anode active material having pores exhibiting a bimodal size distribution with two pore diameter peaks as measured by a Barrett-Joyner-Halenda (BJH) pore size distribution from a nitrogen adsorption. The porous anode active material has the pores having a bimodal size distribution, and thus may efficiently remove a stress occurring due to a difference of expansion between a carboneous material and a metallic active material during charging and discharging. Further, the anode electrode and the lithium battery comprising the anode active material have excellent charge/discharge characteristics.

9 Claims, 4 Drawing Sheets

(56) References Cited

U.S. PATENT DOCUMENTS

| | | | |
|---|---|---|---|
| 5,531,943 | A | 7/1996 | Sudani et al. |
| 5,888,430 | A | 3/1999 | Wakayama et al. |
| 6,432,579 | B1 | 8/2002 | Tsuji et al. |
| 6,558,841 | B1 | 5/2003 | Nakagiri et al. |
| 6,638,662 | B2 | 10/2003 | Kaneda et al. |
| 8,105,718 | B2 * | 1/2012 | Nakanishi et al. ....... 429/231.95 |
| 2002/0168574 | A1 | 11/2002 | Ahn et al. |
| 2003/0008212 | A1 | 1/2003 | Akashi et al. |
| 2003/0049529 | A1 * | 3/2003 | Cho et al. ................ 429/217 |
| 2003/0053945 | A1 | 3/2003 | Fukuoka et al. |
| 2003/0129497 | A1 | 7/2003 | Yamamoto et al. |
| 2004/0033419 | A1 | 2/2004 | Funabiki |
| 2004/0121236 | A1 | 6/2004 | Shen et al. |
| 2005/0058589 | A1 | 3/2005 | Lundquist et al. |
| 2005/0118500 | A1 | 6/2005 | Yata et al. |
| 2005/0233213 | A1 | 10/2005 | Lee et al. |
| 2006/0018822 | A1 | 1/2006 | Okamoto |
| 2006/0087799 | A1 | 4/2006 | Kosuda et al. |
| 2006/0166098 | A1 | 7/2006 | Tabuchi et al. |
| 2007/0258879 | A1 | 11/2007 | Karles et al. |
| 2012/0189913 | A1 * | 7/2012 | Wakizaka et al. ............ 429/211 |

FOREIGN PATENT DOCUMENTS

| | | | |
|---|---|---|---|
| CN | 1507092 | A | 6/2004 |
| CN | 1559092 | A | 12/2004 |
| CN | 1567617 | A | 1/2005 |
| JP | 06-318454 | | 11/1994 |
| JP | 9-249407 | | 9/1997 |
| JP | 11-273675 | | 10/1999 |
| JP | 2000-243395 | | 9/2000 |
| JP | 2001-196065 | | 7/2001 |
| JP | 2001-283848 | | 10/2001 |
| JP | 2002008652 | A * | 1/2002 |
| JP | 2002-042806 | | 2/2002 |
| JP | 2002-201360 | | 7/2002 |
| JP | 2002-260637 | | 9/2002 |
| JP | 2002-260651 | | 9/2002 |
| JP | 2002-373653 | | 12/2002 |
| JP | 2003-160328 | | 6/2003 |
| JP | 2003-192327 | | 7/2003 |
| JP | 2003-197191 | | 7/2003 |
| JP | 2003-346803 | | 12/2003 |
| JP | 2004-158205 | | 6/2004 |
| JP | 2005-93984 | A | 4/2005 |
| JP | 2005-123175 | | 5/2005 |
| JP | 2005-135925 | | 5/2005 |
| JP | 2005-158721 | | 6/2005 |
| JP | 2006-36576 | A | 2/2006 |
| KR | 10-1998-0023035 | | 7/1998 |
| KR | 10-2001-0105622 | A | 11/2001 |
| KR | 10-2004-0096276 | A | 11/2004 |
| WO | WO 99/00001 | A3 | 1/1999 |
| WO | WO 03/096449 | | 11/2003 |

OTHER PUBLICATIONS

Chen, W. X. et al., "*Electrochemical Insertion/extraction of Lithium in Multiwall Carbon Nanotube/Sb and $SnSb_{0.5}$ Nanocomposites*", DSpace@MIT, Molecular Engineering of Biological and Chemical Systems (2003), 6 pages.

SIPO Registration Determination Certificate dated May 19, 2010, issued in Chinese Patent application 200710001650.8, with English translation.

SIPO Patent Publication dated Oct. 7, 2009, for Chinese Patent Application 200510064093.5.

KIPO Notoice of Allowance dated Feb. 12, 2008 for the priority Korean application No. 10-2006-0130375, 4 pages.

U.S. Office action dated Jan. 8, 2009, for cross reference U.S. Appl. No. 11/077,377.

U.S. Office action dated Jan. 22, 2010, for cross reference U.S. Appl. No. 11/077,377.

U.S. Office action dated Aug. 3, 2010, for cross reference U.S. Appl. No. 11/077,377.

U.S. Office action dated Jul. 21, 2009, for cross-reference U.S. Appl. No. 11/689,941.

U.S. Office action dated Dec. 11, 2009, for cross-reference U.S. Appl. No. 11/689,941.

U.S. Office action dated Apr. 26, 2011, for cross-reference U.S. Appl. No. 11/689,941.

Japanese Office action dated May 29, 2012, for corresponding Japanese Patent application 2007-058912, (2 pages).

Patent Abstracts of Japan, and English machine translation of Japanese Publication 2005-135925 listed above, (46 pages).

Patent Abstracts of Japan, and English machine translation of Japanese Publication 2005-158721 listed above, (45 pages).

U.S. Office action dated Jan. 31, 2011, for U.S. Appl. No. 11/829,787, (19 pages).

U.S. Office action dated Jan. 14, 2011, for cross reference U.S. Appl. No. 11/077,377, (17 pages).

U.S. Notice of Allowance dated Jul. 22, 2011, for U.S. Appl. No. 11/829,787, (11 pages).

U.S. Office action dated Aug. 23, 2011 for cross reference U.S. Appl. No. 11/689,941, (12 pages).

KIPO Office action dated Jan. 14, 2013, for Korean Patent application 10-2006-0034671, ) (6 pages).

Patent Abstracts of Japan, and English machine translation for Japanese Publication 2005-123175 listed above, (37 pages).

\* cited by examiner

POROUS ANODE ACTIVE MATERIAL, METHOD OF PREPARING THE SAME, AND ANODE AND LITHIUM BATTERY EMPLOYING THE SAME

CROSS-REFERENCE TO RELATED PATENT APPLICATION

This application is a divisional of application Ser. No. 11/829,787 filed Jul. 27, 2007 which claims priority to and the benefit of Korean Patent Application No. 10-2006-0130375, filed on Dec. 19, 2006, in the Korean Intellectual Property Office, the disclosures of which are incorporated herein in their entirety by reference.

BACKGROUND OF THE INVENTION

1. Field of the Invention

The present invention relates to a porous anode active material, a method of preparing the same, and an anode and a lithium battery employing the same. More particularly, the present invention relates to a porous anode active material comprising pores having a bimodal size distribution, a method of preparing the same, and an anode and a lithium battery employing the same.

2. Description of the Related Art

Non-aqueous electrolytic secondary batteries using lithium compounds as anodes have high voltages and energy densities, and thus have been actively studied. In particular, vigorous research has been conducted on lithium due to its high battery capacity in the early time when lithium attracted attentions as a material for anodes. However, when lithium metal is used as an anode, a large amount of lithium dendrites is formed on a surface of the lithium metal during charging, thereby decreasing charge/discharge efficiency or allowing short circuit to occur between the anode and a cathode. Further, due to instability, i.e., high reactivity of lithium, lithium anodes are sensitive to heat or an impact and have a risk of explosion. Thus, it is impossible for lithium anodes to be widely used. These problems were overcome by using carbon anodes. Carbon anodes are in so-called rocking-chair mode, in which lithium ions in an electrolytic solution participate in redox reactions while being intercalated or deintercalated between crystal planes of carbon electrodes during charging and discharging, without using lithium metal.

Carbon anodes greatly contributed to population of lithium batteries by overcoming various disadvantages of lithium metal. However, as various portable devices become smaller and lighter and have higher performance, the need for lithium secondary batteries having higher capacity is increasing. Lithium batteries containing carbon anodes essentially have low battery capacity due to a porous structure of carbon. For example, even graphite having the highest crystallinty has a theoretical capacity of about 372 mAh/g as measured in the form of $LiC_6$, which is at most about 10% of a theoretical capacity of lithium metal of 3860 mAh/g. Thus, even though metal anodes have the above problems, many attempts have been made to increase battery capacity by introducing metals, such as lithium, into anodes.

It is known that lithium and its alloys, such as lithium-aluminum, lithium-lead, lithium-tin, and lithium-silicon, etc. may provide greater electric capacities than carbonaceous materials. However, when lithium or its alloys are used alone, dendrite lithium may be formed on its surface. Thus, attempts have been made to increase electric capacity while preventing short circuit by suitably mixing lithium or its alloys with carbonaceous materials.

However, the lithium metal materials have volumetric expansions different from carbonaceous materials during redox reactions and react with an electrolytic solution. When an anode material is charged, lithium ions enter the anode, thereby allowing the anode to expand and have a denser structure. Then, when the anode is discharged, lithium ions are released from the anode, thereby decreasing a volume of the anode material. In this case, due to the difference of the expansion ratio between the carbonaceous material and the metal material, when they shrink back, a vacant space is formed in the anode and even, electrically broken portions are generated. Thus, electrons cannot easily move in the anode and an efficiency of a battery decreases. Further, during the charging and discharging, the metal material reacts with an electrolytic solution and a lifetime of the electrolytic solution decreases, thereby decreasing a lifetime and an efficiency of the battery. To overcome the above problems due to the use of the composite material, various technique were suggested.

Japanese Laid-Open Patent Publication No. 1994-318454 discloses an anode including a mixture of metal or alloy powders in the shape of scales, carbon powders in the shape of scales, and a binder. In the anode, the metal or alloy powders are layered one upon another, parallel to a surface of the electrode, and thus when the electrode expands and shrinks during operation of the electrode, a constant pressure is applied to a whole of the electrode, thereby preventing deterioration of current collection after repetition of charge/discharge cycles. However, it is difficult to solve the above problems due to the charging and discharging only by using the mixture containing the flat powders. A stress is generated according to expansion and shrink of the metal and routes of electron transfer are greatly broken. Thus, as the number of charge/discharge cycles increases, a battery capacity greatly decreases.

Japanese Laid-Open Patent Publication No. 1997-249407 discloses an anode including highly crystalline graphite particles and fine metal particles capable of forming an alloy with lithium. Raw powders consisting of the graphite particles and the metal particles are prepared and pulverized to obtain a composite in which the crystalline graphite particles and fine metal particles are dispersed. The feature of the invention lies in the use of the fine metal particles. However, the anode is formed by simply assembling them, and thus when the metal particles expand, bonds between the metal particles and the graphite particles are broken.

Thus, there is a need for an anode active material having excellent charge/discharge characteristics without having the above problems.

SUMMARY OF THE INVENTION

The present invention provides a porous anode active material comprising pores having a bimodal size distribution therein.

The present invention also provides an anode electrode and a lithium battery comprising the anode active material, which have enhanced charge/discharge efficiency and effective charge/discharge capacity.

The present invention also provides a method of preparing the porous anode active material.

According to an aspect of the present invention, there is provided a porous anode active material comprising:
fine particles of metallic substance capable of forming a lithium alloy;
a crystalline carbonaceous substance; and
a porous carbonaceous material coating and binding the fine particles of metallic substance and the crystalline carbonaceous substance, the porous anode active material having pores exhibiting a bimodal size distribution with two pore diameter peaks in a Barrett-Joyner-Halenda (BJH) pore size distribution as measured by a nitrogen adsorption test.

According to another aspect of the present invention, there is provided a method of preparing a porous anode active material, comprising:
preparing a solution containing fine silicon particles, graphite particles, a carbon precursor, and a surfactant;
drying and thermally curing the solution while stirring it to obtain a gelling material; and
sintering the gelling material.

According to still another aspect of the present invention, there are provided an anode and a lithium battery comprising the porous anode active material.

The anode active material according to an embodiment of the present invention contains pore having a bimodal size distribution, unlike a conventional anode active material without having pores therein. Thus, the anode active material according to an embodiment of the present invention may efficiently remove a stress occurring due to a difference of expansion ratio between a carboneous material and a metallic active material during charging and discharging. Further, the anode electrode and the lithium battery comprising the anode active material have excellent charge/discharge characteristics.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

According to an embodiment of the present invention, there is provided a porous anode active material comprising:
fine particles of metallic substance capable of forming a lithium alloy;
a crystalline carboneous substance; and
a porous carboneous material coating and binding the fine particles of metallic substance and the crystalline carboneous substance,
the porous anode active material having pores exhibiting a bimodal size distribution with two pore diameter peaks in a Barrett-Joyner-Halenda (BJH) pore size distribution as measured by a nitrogen adsorption test.

The BJH pore size distribution is described in more detail (see J. Am. Chem. Soc., 1951, 73, 373).

Figure 1:
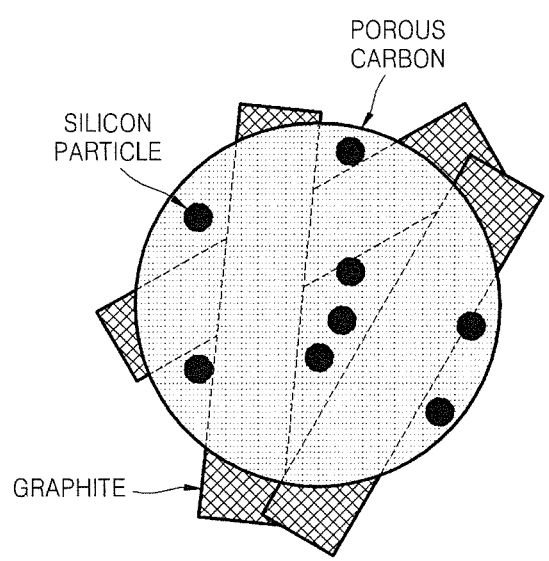
FIG. 1 is a schematic cross-sectional view illustrating an anode active material prepared in Example 1 according to an embodiment of the present invention.
Figure 2:
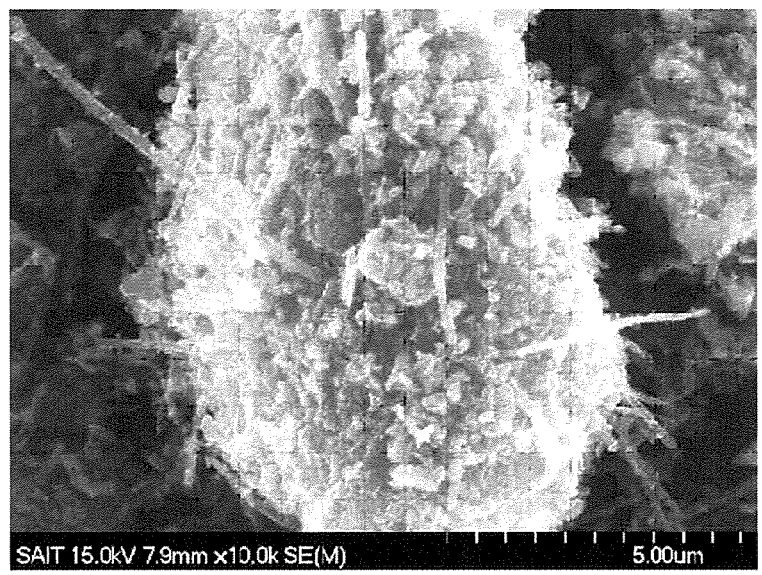
FIG. 2 is a scanning electron microscopy (SEM) photograph illustrating the anode active material prepared in Example 1.

FIG. 1 is a schematic cross-sectional view illustrating an anode active material prepared in Example 1 according to an embodiment of the present invention. Referring to FIG. 1, fine silicon particles and graphite particles are coated with a coating layer of a porous carboneous material. FIG. 2 is a scanning electron microscopy (SEM) photograph illustrating the anode active material prepared in Example 1. Referring to FIG. 2, fibrous graphite particles are exposed to outside of the anode active material and the fine silicon particles and pores are present in the anode active material.

Highly crystalline graphite particles having an interlayer spacing ($d_{002}$) of 3.45 Å or less are used as the fibrous graphite particles contained in the porous anode active material. The graphite particles used in an embodiment of the present invention may be any graphite particles commonly used in the art, such as artificial graphite and natural graphite, etc. and their size and shape are not specifically limited.

The fine silicon particles may participate in a reversible redox reaction with lithium during charging and discharging, like the graphite particles, and thus may increase an energy density of the anode active material. Since charge and discharge potentials of the fine silicon particles are similar to those of the graphite particles and a discharge curve of the fine silicon particles is constant relative to the potential, a discharge capacity of the anode active material may increase.

Figure 3:
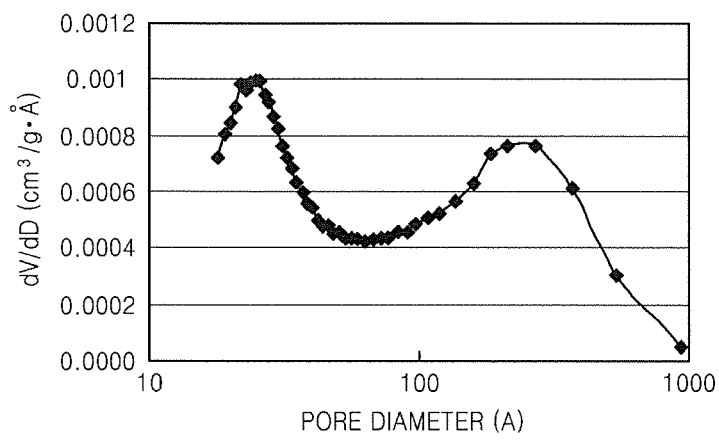
FIG. 3 is a graph illustrating a pore size distribution of the anode active material prepared in Example 1.

FIG. 3 is a graph illustrating a pore size distribution of the anode active material of an embodiment of the present invention. Referring to FIG. 3, the porous anode active material contains pores exhibiting a bimodal size distribution with two pore diameter peaks, i.e., a first peak (on the left side) and a second peak (on the right side). It is believed that the bimodal size distribution is observed since two types of pores, i.e., pores obtained by a surfactant forming a template together with a carbon precursor and pores obtained due to the graphite and the fine silicon particles, are present.

Since in the porous anode active material, the fine silicon particles and the graphite particles are coated with and binded with the carbon layer containing pores having a pore size of several nanometers, the carbon layer may absorb a stress applied on the particles according to the shrink/expansion of the fine silicon particles.

If a carbon precursor cannot form pores is used, pores having a pore size of several tens nanometer or greater which are formed due to a mixing of the fine silicon particles and the graphite particles are filled with the carbon, it is highly probable that the porosity decreases. Even if the pores are not filled with the carbon, since the carbon precursor cannot form pores forms a hard carbon layer, the carbon layer cannot stand the stress applied by the shrink/expansion of the fine silicon particles and will be easily broken. If a greater amount of carbon precursor cannot form pores is used to prevent the break of the carbon precursor, a capacity of the anode active material will decrease. A carbon precursor used in the present invention may form pores.

In the porous anode active material, the pores may have a first peak in a range of the pore size from 1 nm to less than 10 nm and a second peak in a range of the pore size from greater than 10 nm to 100 nm. Preferably, the pores may have the first peak in a range of the pore size of 2-8 nm and the second peak in a range of the pore size of 20-80 nm.

If the first peak is in a range of the pore size of less than 1 nm, irreversible reactions such as decomposition of an electrolyte, etc. increase. If the second peak is in a range of the pore size of greater than 100 nm, a density of the electrode plate decreases.

The porous anode active material may have a pore volume of 0.2-2 cm$^3$/g. The pore volume used herein refers to a volume of pores per unit mass of the active material. If the pore volume is less than 0.2 cm$^3$/g, the electrode is subjected to a significant mechanical deterioration due to its expansion during charging and discharging. If the pore volume is greater than 2 cm$^3$/g, irreversible reactions such as decomposition of an electrolyte, etc. increase.

The porous anode active material may have a porosity of 5-60%. The porosity used herein refers to a ratio of volume of pores in a total volume of the active material. If the porosity is less than 5%, it is difficult to inject the electrolytic solution into the porous anode active material. If the porosity is greater than 60%, a density of the electrode decreases.

Average pore diameters corresponding to the two pore diameter peaks may be respectively 2-8 nm (a first average pore diameter) and 20-80 nm (a second average pore diameter). If the first average pore diameter deviates from a range of 2-8 nm, irreversible reactions such as decomposition of an electrolyte, etc. increase. If the second average pore diameter deviates 20-80 nm, a density of the electrode decreases.

In the porous anode active material, examples of the metallic substance capable of forming a lithium alloy include Si, SiO$_x$, Sn, SnOx, Ge, GeO$_x$, Pb, PbO$_x$, Ag, Mg, Zn, ZnO$_x$, Ga, In, Sb, Bi, and alloys or complexes thereof, in which x is a real number of 0.1-6. Preferably, the metallic substance may be Si or SiO$_x$.

In the porous anode active material, examples of the crystalline carboneous substance include carbon fibers, graphite, and carbon nanotubes (CNTs), etc.

The carbon fibers may be highly crystalline and have an aspect ratio of 10 or greater.

The carbon fibers may be prepared using various methods. Fine fibrous materials, such as multi-structured CNTs, carbon nano fibers, etc. which are prepared using, for example, an arc discharging method or a laser method, may be used as the carbon fibers. Preferably, the carbon fibers may be VGCFs (vapor grown carbon fibers) which are prepared using a vapor grown method, but is not limited thereto.

The graphite may be present in the form of flakes or needles.

In the porous anode active material, a coating layer of the porous carboneous material coating and binding the fine particles of metallic substance and the crystalline carboneous substance may have an interlayer spacing (d$_{002}$) of 3.45 Å or greater (i.e., low-crystalline) or may be amorphous. If the coating layer is highly crystalline, it plays a role like graphite and reacts with the electrolytic solution on its surface. A low-crystalline or amorphous coating layer does not react with the electrolytic solution during charging and discharging, thereby preventing decomposition of the electrolytic solution and increasing charge/discharge efficiency.

The concentration of the metallic substance capable of forming a lithium alloy in the porous anode active material may be 10-60% by weight based on the total weight of the porous anode active material. If the concentration of the metallic substance is greater than 60% by weight, charge/discharge efficiency decreases. If the concentration of the metallic substance is less than 10% by weight, an energy density decreases.

The concentration of the crystalline carboneous substance in the porous anode active material may be 10-60% by weight based on the total weight of the porous anode active material. If the concentration of the crystalline carboneous substance is greater than 60% by weight, an energy density decreases. If the concentration of the crystalline carboneous substance is less than 10% by weight, charge/discharge efficiency decreases.

The coating layer in the porous anode active material may be a product obtained by sintering a low molecular weight carbon precursor and a surfactant. Examples of the low molecular weight carbon precursor include phenol, resorcinol, formaldehyde, and acetaldehyde or mixtures and oligomers thereof, etc.

Examples of the surfactant include an amphophilic surfactant, such as a triblock copolymer having PEO repeating units, a cationic surfactant, a non-ionic alkylpolyethyleneoxide oligomer, etc, wherein an ethylene oxide repeating unit is a hydrophilic group and an alkyl group and a propylene oxide repeating unit are hydrophobic groups.

According to another embodiment of the present invention, there are provided an anode and a lithium battery comprising the porous anode active material.

The anode according to an embodiment of the present invention is characterized in that it is prepared using the porous anode active material.

The anode may be prepared by mixing the porous anode active material with a binder and then forming the resultant mixture into a predetermined shape. Alternatively, the anode may be prepared by applying a mixture of the porous anode active material and a binder to a current collector, such as a copper foil.

For example, the anode may be prepared by coating the anode active material composition directly on a copper foil or by casting the anode active material composition on a separate substrate to form a film, releasing the film from the substrate and laminating the released film to a copper foil to obtain an anode plate. In addition to the above forms, the anode may have any form.

It is necessary for a battery to have a high capacity, i.e., to charge or discharge with a large amount of current. For this, an electrode material should have low electrical resistance. To reduce the electrical resistance of the electrode, various conductive materials are generally added to the electrode. As the conductive materials, carbon black, fine graphite particles, etc. are mainly used.

The lithium battery according to an embodiment of the present invention is characterized in that it is prepared using the porous anode active material. The lithium battery may be prepared as follows.

First, a cathode active material, a conductive material, a binder, and a solvent are mixed together to prepare a cathode active material composition. A cathode may be prepared by coating the cathode active material composition directly on a metal current collector and drying the coated composition. Alternatively, a cathode plate may be prepare by casting the cathode active material composition on a separate substrate to form a film, releasing the film from the substrate and laminating the released film to a metal current collector.

The cathode active material may be any lithium-containing metal oxide commonly used in the art, for example, LiCoO$_2$, LiMn$_x$O$_{2x}$, LiNi$_{x-1}$Mn$_x$O$_{2x}$ (x=1, 2), Li$_{1-x-y}$Co$_x$Mn$_y$O$_2$ (0≤x≤0.5, 0≤y≤0.5), etc., more specifically LiMn$_2$O$_4$, LiCoO$_2$, LiNiO$_2$, LiFeO$_2$, V$_2$O$_5$, TiS, and MoS, etc., in which lithium may be reduced and oxidized. Examples of the conductive material include graphite and carbon black. Examples of the binder include vinyl fluoride-hexafluoropropylene copolymers, polyvinylidene fluoride (PVDF), polyacrylonitrile, polymethylmetacrylate, polytetrafluoroethylene (PTFE) and mixtures thereof, and styrene-butadiene rubber polymers. Examples of the solvent include N-methylpyrrolidone, acetone, and water. The concentrations of the cathode active material, the conductive material, the binder and the solvent may be those commonly used in the art.

The lithium battery may include any separator commonly used in the art. The separator may have low resistance to transfer of electrolytic ions and an excellent ability of impregnating an electrolytic solution. The separator may be made of glass fibers, polyester, Teflon, polyethylene, polypropylene, PTFE, and combinations thereof and may be non-woven fabric or woven fabric. Specifically, lithium ion batteries may contain a separator made of a material, such as polyethylene or polypropylene and capable of being wound. Lithium ion polymer batteries may contain a separator having an excellent ability of impregnating an organic electrolytic solution, and the separator may be prepared as follows:

First, a polymer resin, a filler, and a solvent are mixed together to prepare a separator composition. Then, the separator composition is directly coated on an electrode and dried to form a separator film. Alternatively, the separator composition is cast and dried on a separate substrate to form a film, the film is released from the substrate, and then the released film is laminated on the electrode.

Examples of the polymer resin include any one commonly used as a binder for an electrode plate, for example, vinylidene fluoride/hexafluoropropylene copolymers, PVDF, polyacrylonitrile, polymethylmetacrylate, and mixtures thereof.

The electrolytic solution may be prepared by dissolving at least one electrolyte selected from the group consisting of lithium salts, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO2)(C_yF_{2y+1}SO_2)$ (in which each of x and y is a natural number), LiCl, LiI, etc., in a solvent, such as propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, dimethylether, or mixtures thereof.

The separator is disposed between the cathode and the anode to form a battery assembly. Subsequently, the battery assembly may be wound or fold to be introduced into a cylindrical battery case or a square battery case, and then an organic electrolytic solution is injected into the case to complete the lithium ion battery.

In addition, the lithium ion polymer battery may be obtained by layering the battery assemblies as above to form a bi-cell structure, impregnating the bi-cell structure with an organic electrolytic solution, and sealing the resultant product in a pouch.

According to another embodiment of the present invention, there is provided a method of preparing a porous anode active material, comprising: preparing a solution containing fine silicon particles, graphite particles, a carbon precursor, and a surfactant; drying the solution while stirring it to obtain a dried product; and sintering the dried product.

In order to increase dispersion of the fine silicon particles and the graphite particles in the solution, first, a solution containing the carbon precursor and the surfactant may be prepared and then, the fine silicon particles and the graphite particles may be added to the solution.

The preparation of the solution containing fine silicon particles, graphite particles, a carbon precursor, and a surfactant may comprise producing a basic solution of the carbon precursor and neutralizing the basic solution with an acid then drying the neutralized solution; adding a solvent and the surfactant to the dried carbon precursor to obtain a solution containing the carbon precursor and the surfactant; and adding the fine silicon particles and the graphite particles to the obtained solution.

The concentration of the surfactant in the solution containing the fine silicon particles, the graphite particles, the carbon precursor, and the surfactant may be 10-300 parts by weight, based on 100 parts by weight of the carbon precursor. If the concentration of the surfactant deviates from the above range, the amount of the pores is too small or it is difficult to form a coating layer of the carbon precursor.

In particular, sizes of the pores may be controlled by adjusting the concentration and type of the surfactant and it is possible to design the structure of the active material more elaborately.

Examples of the carbon precursor include a low molecular weight substance having a molecular weight less than 200 and an oligomer substance having a molecular weight of 500-5000, such as alcohol or aldehyde, etc. Specifically, the carbon precursor may be at least one compound selected from the group consisting of phenol, resorcinol, formaldehyde, and acetaldehyde and oligomers thereof.

The surfactant may be a compound having any one of formulae 1 to 3:

$$(EO)_l\text{-}(PO)_m\text{-}(EO)_n \qquad (1)$$

wherein
EO is ethylene oxide,
PO is propylene oxide,
each of l, m and n is a real number of 5-200, $$C_pH_{2p+1}(OC_2H_4)_rOH \qquad (2)$$

wherein
each of p and r is a real number of 5-100, $$CH_3C(CH_3)_2CH_2C(CH_3)_2C_6H_4(OC_2H_4)_sOH \qquad (3)$$

wherein
s is a real number of 5-100.

The surfactant may be at least one compound selected from the group consisting of $(EO)_{106}\text{-}(PO)_{70}\text{-}(EO)_{106}$, $(EO)_{100}\text{-}(PO)_{39}\text{-}(EO)_{100}$, $(EO)_{80}\text{-}(PO)_{30}\text{-}(EO)_{80}$, $(EO)_5\text{-}(PO)_{70}\text{-}(EO)_5$, $(EO)_{20}\text{-}(PO)_{70}\text{-}(EO)_{20}$, and $(EO)_{20}\text{-}(PO)_{30}\text{-}(EO)_{20}$.

In the surfactant, an ethylene oxide repeating unit is a hydrophilic group and a propylene oxide repeating unit, $C_pH_{2p+1}$ and $CH_3C(CH_3)_2CH_2C(CH_3)_2C_6H_4$ are hydrophobic groups. Functions of the surfactant will be explained in more detail. However, this explanation is provided for the purpose of illustration and is not intended to limit the scope of the invention.

The surfactant may play a role as a template in the solution containing the fine silicon particles, the graphite particles, the carbon precursor, and the surfactant. After drying the solution, the carbon precursor is thermally cured at 90-100° C., allowing the product to be converted from a gelling state to a dried product. During the gelling state, the surfactant functions as a template having a fine and regular structure and the dispersed fine silicon particles and graphite particles are immobilized by the gelled carbon precursor. After sintering the product, the surfactant as the template is removed from the product and a coating of the porous carboneous material, which is a sintered product of the carbon precursor, has a constant regularity.

It is believed that pores of the porous anode active material prepared using the method have a bimodal size distribution since two types of pores are present, i.e., pores formed from spaces, which had been generated during the mixing of the fine silicon particles and the graphite particles, by gelling the carbon precursor, and pores obtained by removing a surfactant from the gelled carbon precursor.

The fine silicon particles may be those previously capped with an organic amine. Examples of the organic amine include, but are not limited to, an alkyl amine having 1 to 5 carbon atoms. The alkyl amine allows a surface of the fine silicon particles to be charged according to the type of solvent. The graphite particles may be pretreated with an acid to have an acidic functional group, such as, —COON, etc. on its surface. Due to the polar functional groups on their surfaces, the fine silicon particles and fibrous graphite particles may have increased dispersion during the preparation of the porous anode active material.

In the method of preparing the porous anode active material, the carbon precursor may be sintered at a temperature ranging from a carbonization temperature of the carbon precursor to 1400° C. If the sintering temperature is greater than 1400° C., the fine silicon particles are melted.

Hereinafter, the present invention will be described in more detail with reference to the following examples. However, these examples are for illustrative purposes only and are not intended to limit the scope of the invention.

EXAMPLES

Preparation of Anode Active Materials

Example 1

2.0 g of silicon powders having an average diameter of 3 µm was added to 5 g of methanol and an ultrasonic wave was irradiated to the mixture in an ultrasonic bath for 10 minutes. Then, while stirring the solution, aminopropyltrimethoxysilane (APS) was slowly added dropwise thereto, and then further stirred for 5 hours. An excess amount of methanol was added to the stirred solution and centrifuged and then a supernatant was removed, which was repeated three times to remove unreacted APS from the solution. The solution was dried at 80° C. to obtain fine silicon particles having their surfaces capped with the alkyl amine.

5 g of crystalline carbon fibers (VGCFs), 100 mL of 60% nitric acid, and 50 mL of deionized water were placed into a container made of high density polyethylene (HDPE) and milled with zirconia balls for 7 days. The resultant product was centrifuged and dried.

0.61 g of phenol, 0.13 g of a NaOH solution (20% by weight), and 1.05 g of a formaldehyde solution (37% by weight) were mixed and stirred at 70° C. for 1 hour, and cooled to room temperature. Then, a 0.6 M HCl solution was added dropwise to the resultant alkaline solution to be neutralized and dried under vacuum. 1 g of a surfactant (Pluronic F127, $(EO)_{106}$-$(PO)_{70}$-$(EO)_{106}$) and 20 g of ethanol were added to the dried product and mixed together to obtain a carbon precursor solution containing the surfactant.

Subsequently, 0.1 g of the fine silicon particles capped with the alkyl amine, 0.2 g of the crystalline carbon fibers treated with the acid, 3.57 g of the carbon precursor solution containing the surfactant, and 2.5 g of ethanol were mixed. The obtained mixture was dried in an oven at 80° C. for 5 hours and 100° C. for 12 hours. The dried product was sintered in a nitrogen atmosphere at 900° C. for 1 hour to obtain a porous anode active material.

Example 2

A porous anode active material was prepared in the same manner as in Example 1, except that silicon powders having an average diameter of 70 nm were used instead of the silicon powders having an average diameter of 3 µm and that graphite particles (SFG-6, manufactured by TimCal) were used instead of the crystalline carbon fibers (VGCFs).

Example 3

A porous anode active material was prepared in the same manner as in Example 1, except that SiO powders having an average diameter of 5 µM were used instead of the silicon powders having an average diameter of 3 µm and that graphite particles (SFG-6, manufactured by TimCal) were used instead of the crystalline carbon fibers (VGCFs).

Comparative Example 1

A porous anode active material was prepared in the same manner as in Example 1, except that a carbon precursor solution was prepared without a surfactant.

Comparative Example 2

A porous anode active material was prepared in the same manner as in Example 2, except that a carbon precursor solution was prepared without a surfactant.

Comparative Example 3

1.5 g of SiO powders having an average diameter of 5 µm and 1.5 g of graphite particles (SFG-6, manufactured by TimCal) together with 20 g of steel balls were placed into a container of stainless steel and was subjected to a high energy milling using SPEX mill (60 minutes). The milled mixture was used as an anode active material without further processing.

Nitrogen Adsorption Test

The porous anode active material obtained in Example 1 was subjected to a nitrogen adsorption test using SURFACE AREA ANALYZER (TRISTAR-3000) (manufactured by MICROMERITICS). FIG. 3 is a graph illustrating a Barrett-Joyner-Halenda (BJH) pore size distribution of the anode active material prepared in Example 1. Referring to FIG. 3, the porous anode active material obtained in Example 1 has a bimodal size distribution with two pore diameter peaks, wherein a first peak corresponds to pores having a pore diameter of about 2.5 nm, which are believed to be induced from the surfactant, and a second peak corresponds to pores having a pore diameter of about 25 nm, which are believed to be induced from the crystalline carbon fibers.

Preparation of Anodes

Example 4

0.075 g of the porous anode active material powders obtained in Example 1, 0.015 g of graphite particles having an average diameter of 6 µm (SFG-6, manufactured by TimCal), and 0.1 g of a solution of 5% by weight of polyvinylidene fluoride (PVDF, KF1100, Kureha Chemical Industry Corporation, Japan) in N-methylpyrrolidone (NMP) were mixed and stirred using a mortar for 30 minutes to obtain a slurry.

The slurry was coated to a thickness of about 40 μm on a copper (Cu) foil with a doctor blade and dried at room temperature and dried again under vacuum at 110° C. The resultant product was rolled to a thickness of about 30 μm using a roller to prepare an anode plate.

Examples 5 and 6 and Comparative Examples 4 to 6

Anodes were prepared in the same manner as in Example 4, except that each of the anode active materials obtained in Example 2 and 3 and Comparative Examples 1 to 3 was used instead of the anode active material obtained in Example 1.

g of the active material until the voltage reached to 1.5 V. Charge/discharge capacities of the cells were measured according to the number of cycles. Then, charge/discharge efficiency and capacity retention were calculated using equations 1 and 2:

$$\text{Charge/discharge efficiency}(\%) = \text{Discharge capacity}/\text{Charge capacity} \times 100 \qquad \text{Equation 1}$$

$$\text{Capacity retention}(\%) = \text{Discharge capacity at the } 50^{th} \text{ cycle}/\text{Discharge capacity at the } 1^{st} \text{ cycle} \times 100 \qquad \text{Equation 2}$$

Figure 4:
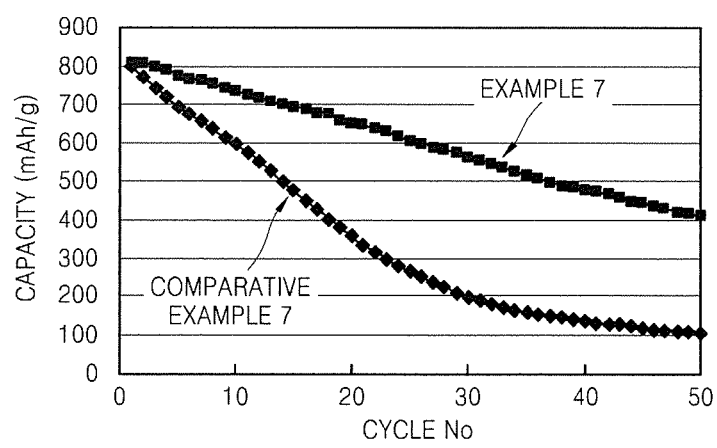
FIG. 4 is a graph illustrating the number of cycles vs. capacity of lithium batteries prepared in Example 7 and Comparative Example 7.
Figure 5:
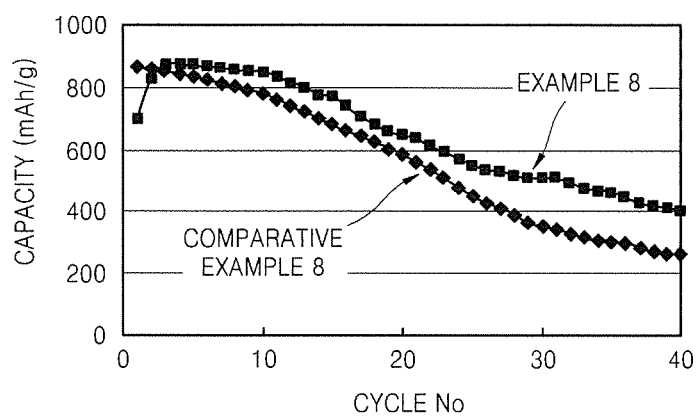
FIG. 5 is a graph illustrating the number of cycles vs. capacity of lithium batteries prepared in Example 8 and Comparative Example 8.
Figure 6:
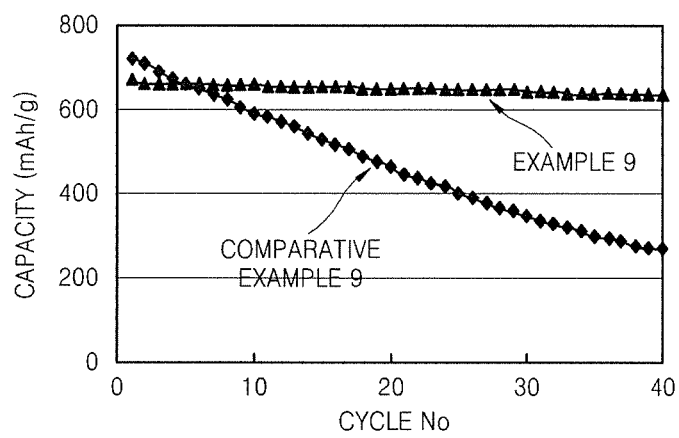
FIG. 6 is a graph illustrating the number of cycles vs. capacity of lithium batteries prepared in Example 9 and Comparative Example 9.

The results of the charge/discharge tests for the coin cells are shown in Table 1 and FIGS. 4 to 6.

TABLE 1

|  | 1st Cycle | | | 50th Cycle | | | |
| --- | --- | --- | --- | --- | --- | --- | --- |
|  | Discharge capacity (mAh/g) | Charge capacity (mAh/g) | Discharge/Charge efficiency (%) | Discharge capacity (mAh/g) | Charge capacity (mAh/g) | Discharge/Charge efficiency (%) | Capacity retention (%) |
| Example 7 | 809 | 1244 | 65 | 413 | 427 | 97 | 51 |
| Example 8 | 695 | 1101 | 63 | 290 | 294 | 98 | 42 |
| Example 9 | 670 | 1243 | 54 | 619 | 624 | 99 | 92 |
| Comparative Example 7 | 798 | 1038 | 77 | 107 | 110 | 98 | 13 |
| Comparative Example 8 | 869 | 1135 | 77 | 223 | 227 | 98 | 26 |
| Comparative Example 9 | 719 | 1161 | 62 | 209 | 214 | 98 | 29 |

Preparation of Lithium Batteries

Example 7

A 2016 standard coin cell was prepared using the anode obtained in Example 4 and a counter electrode made of lithium metal, a separator made of PTFE, and an electrolyte solution of 1.3 M $LiPF_6$ in ethylene carbonate (EC)+diethyl carbonate (DEC) (volume ratio of 3:7).

Examples 8 and 9 and Comparative Examples 7 to 9

Coin cells were prepared in the same manner as in Example 7, except that each of the anodes obtained in Examples 5 and 6 and Comparative Examples 4 to 6 was used instead of the anode plate obtained in Example 1.

Charge/Discharge Test

The coin cells obtained in Examples 7 and 8 and Comparative Examples 7 and 8 were charged under a constant current of 100 mA per 1 g of the active material until a voltage against the Li electrode reached 0.001 V. Then, the charged cells were allowed to stand for about 10 minutes and then discharged under a constant current of 100 mA per 1 g of the active material until the voltage reached to 1.5 V. Charge/discharge capacities of the cells were measured according to the number of cycles.

The coin cells obtained in Example 9 and Comparative Example 9 were charged under a constant current of 100 mA per 1 g of the active material until a voltage against the Li electrode reached 0.001 V. Then, the cells were charged under a constant voltage of 0.001 V until the current of the cells reduced to 10 mA per 1 g of the active material. Subsequently, the charged cells were allowed to stand for about 10 minutes and then discharged under a constant current of 100 mA per 1

Referring to FIGS. 4 to 6, the coin cells obtained in Examples 7 to 9 exhibited somewhat lower charge/discharge efficiency, but similar charge/discharge capacity, compared to the coin cells obtained in Comparative Examples 7 to 9.

However, the coin cells obtained in Examples 7 to 9 exhibited at least 1.6 times higher capacity retention after the 50 cycles than the coin cells obtained in Comparative Examples 7 to 9. It is considered that the increased lifetime of cycles was obtained since pores having a bimodal size distribution in the porous anode active material according to an embodiment of the present invention efficiently prevent from cracks occurring due to changes of volumes during the charging and discharging, and further, intercalation/deintercalation of lithium ions are reversible.

The anode active material according to the present invention contains the pore having a bimodal size distribution, unlike a conventional anode active material without having pores therein, and thus may efficiently remove a stress occurring due to a difference of expansion between a carboneous material and a metallic active material during charging and discharging. Further, the anode electrode and the lithium battery comprising the anode active material have excellent charge/discharge characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a porous anode active material, comprising:
   preparing a solution containing fine silicon particles, graphite particles, a carbon precursor, and a surfactant;
   drying and thermally curing the solution while stirring it to obtain a gelling material; and
   sintering the gelling material.

2. The method of claim 1, wherein the concentration of the surfactant in the solution is 10-300 parts by weight, based on 100 parts by weight of the carbon precursor.

3. The method of claim 1, wherein the carbon precursor is a low molecular weight substance having a molecular weight less than 200 or an oligomer substance having a molecular weight of 500-5000.

4. The method of claim 1, wherein the carbon precursor is at least one compound selected from the group consisting of phenol, resorcinol, formaldehyde, and acetaldehyde and oligomers thereof.

5. The method of claim 1, wherein the surfactant is a compound having any one of formulae 1 to 3:

$$(EO)_l\text{-}(PO)_m\text{-}(EO)_n \tag{1}$$

wherein
EO is ethylene oxide,
PO is propylene oxide,
each of l, m and n is a real number of 5-200, $$C_pH_{2p+1}(OC_2H_4)_r OH \tag{2}$$

wherein
each of p and r is a real number of 5-100, $$CH_3C(CH_3)_2CH_2C(CH_3)_2C_6H_4(OC_2H_4)_sOH \tag{3}$$

wherein
s is a real number of 5-100.

6. The method of claim 1, wherein the surfactant is at least one compound selected from the group consisting of $(EO)_{106}\text{-}(PO)_{70}\text{-}(EO)_{106}$, $(EO)_{100}\text{-}(PO)_{39}\text{-}(EO)_{100}$, $(EO)_{80}\text{-}(PO)_{30}\text{-}(EO)_{80}$, $(EO)_5\text{-}(PO)_{70}\text{-}(EO)_5$, $(EO)_{20}\text{-}(PO)_{70}\text{-}(EO)_{20}$, and $(EO)_{20}\text{-}(PO)_{30}\text{-}(EO)_{20}$.

7. The method of claim 1, wherein the fine silicon particles are capped with an organic amine.

8. The method of claim 1, wherein the graphite particles are pretreated with an acid.

9. The method of claim 1, wherein the carbon precursor is sintered at a temperature ranging from a carbonization temperature of the carbon precursor to 1400° C.

* * * * *